March 8, 1966  H. EILENBERG ETAL  3,238,757
METHOD AND APPARATUS FOR MANUFACTURING OIL FILLED CABLES
Filed Oct. 30, 1961  3 Sheets-Sheet 1

INVENTORS
Hanns Eilenberg
Siegfried Rudolph
Hans-Joachim Walther &
Manfred Beyer
BY George H. Spencer
ATTORNEY March 8, 1966  H. EILENBERG ETAL  3,238,757
METHOD AND APPARATUS FOR MANUFACTURING OIL FILLED CABLES
Filed Oct. 30, 1961  3 Sheets-Sheet 3

INVENTORS
Hanns Eilenberg
Siegfried Rudolph
Hans-Joachim Walther &
BY  Manfred Beyer George H Spencer
ATTORNEY

United States Patent Office 3,238,757
Patented Mar. 8, 1966

3,238,757
METHOD AND APPARATUS FOR MANUFACTURING OIL FILLED CABLES
Hanns Eilenberg, Cologne-Ehrenfeld, Siegfried Rudolph, Cologne-Hohenberg, Hans-Joachim Walther, Cologne-Nippes, and Manfred Beyer, Braunschweig, Germany, assignors, by mesne assignments, to Leybold-Anlagen Holding A.G., Zug, Switzerland
Filed Oct. 30, 1961, Ser. No. 148,506
Claims priority, application Germany, Nov. 3, 1960, L 37,426
10 Claims. (Cl. 72—264)

The present invention relates generally to an apparatus and a process for the manufacture of electric cables, and, more particularly, to the production of single or multiple electric oil cables wherein the cable core is dried under vacuum pressure in an impregnating tank, is subsequently impregnated with an impregnating liquid, and is then delivered from the impregnating tank to a jacketing device without contacting the surrounding atmosphere.

Vacuum impregnating processes are used on an extensive scale in the manufacture of electric oil cables because of particularly favorable electrical properties of the insulating covering of the cable conductors which may be thereby achieved. However, difficulties arise in removing the cable core from the treating tank. The cable core is first impregnated with a substantially degassed impregnating liquid under vacuum, and is then fed to a jacketing device which applies a lead jacket thereto. If the finished impregnated cable core comes into contact with the surrounding atmosphere prior to the jacketing operation, for example, when transferring the cable from the impregnating section to the jacketing section, air will be introduced into the insulated covering and cause considerable impairment of the good electrical properties achieved during the impregnating process.

Therefore, attempts are made to seal the cable cores from the atmosphere. A known device for accomplishing this provides an intermediate lock or floodgate which is filled with impregnating liquid between the impregnating tank and the jacketing press. In this device, the cable core is sealed from the surrounding atmosphere by use of a membrane in the removal opening of the impregnating tank. However, this membrane must be removed after termination of the impregnating process proper and prior to the removal of the cable for transportation to the jacketing press.

Although it is possible, by means of this prior-art device, to introduce an impregnated cable into the jacketing press without contact with the surrounding atmosphere, it has been found that fully satisfactory results cannot by obtained in all cases due to the particularly critical operating conditions of known jacketing devices. It is especially difficult to temporarily halt the jacketing device, which is already in operation and finally adjusted to yield the desired jacketing diameter. Yet, this jacketing device must be stopped so that further treating processes may be carried out.

With these defects of the prior art in mind, it is a main object of this invention to provide a device and a process wherein continuous transfer of the cable from the impregnating tank into the jacketing device may be carried out with continuous operation of the jacketing device, after the seal in the removal opening of the impregnating tank has been detached.

Another object of the present invention is to considerably simplify the device and operation thereof in the jacketing of electric oil cables.

These objects and others ancillary thereto are accomplished according to preferred embodiments of the invention, wherein, after introduction of the cable core into the impregnating tank, the free or leading end of the cable is sealed in the removal opening of the impregnating tank by means of a detachable fitted plug of the same diameter as the cable core. Then, the impregnating tank is evacuated, i.e., has a vacuum pressure created therein. If necessary, direct current heating and/or high frequency heating of the cable core may be performed, preferably with use of the cable conductors.

The impregnating tank is then filled with a preferably degassed impregnating liquid. An intermediate vacuum tight lock is provided which is connected in a vacuum type manner with the receiving opening of the jacketing device and the removal opening of the impregnating tank. This lock may be provided with a removable seal on the jacketing device side which includes a feeding element of the same diameter as the cable core. This feeding element is connected with the detachable fitted plug in the removal opening of the impregnating tank by means of a traction element which is loosely disposed in the lock. Then, the intermediate lock is filled with impregnating liquid, and the feeding element is pushed forward into the jacketing device.

The structure for carrying out this process comprises detachable sealing means including a fitted plug and a feeding element both of which have the same diameter as the cable core. The fitted plug is attached to the feeding element by means of a traction element. After the feeding element is pushed into the jacketing device, which is already operating, it is seized by the jacketing device and the cable is completely and continuously fed from the impregnating tank to the jacketing device. The jacketing device first places a metal jacket about the feeding element, then the traction element, the fitted plug, and finally the cable core. The jacketing device is placed into operation after cessation of the impregnating process in the impregnating tank, and it is adjusted to the desired diameter. When the prefabricated jacket device is adjusted to fabricate a jacket of the appropriate dimensions, the feeding element is brought into the receiving opening of the jacketing device and cable feeding is thereby initiated. In the jacketing device, lead, aluminum, or similar technologically suitable materials may be used.

The apparatus advantageously includes an intermediate lock of tubular configuration and having a valve cutoff device near the end of the lock which faces the impregnating tank. On the jacketing device end of the lock, and in the vicinity of the detachably sealed feeding element, a servicing hatch having a peephole is provided. The operator may look through the peephole to visually observe when the intermediate lock is sufficiently filled with oil to provide an oil seal which prevents the entrance of atmospheric air. The operator may then open the service hatch and manually push the feeding element into the receiving opening of the jacket press.

The feeding element is of tubular shape and it is connected to the traction element or rope by means of a damping device. Such damping device may include a piston rod to which the traction rope is connected, the rod being displaceable against spring pressure within the tubular feeding element. This, then, prevents undesired removal of the feeding element due to erratic or jerky movements of the seal at the fitted plug, and thus guarantees uniform and continuous operation of the feeding process.

Nozzle-like elements having sealing throats may be provided in the removal opening of the impregnating tank and/or at the receiving opening of the jacketing device. The sealing elements have passage openings or throats which correspond to the diameter of the cable core. Sealing of these throats may be assured by providing rubber-like gasket rings of resilient material in grooves in the fitted plug and the feeding element.

Since, generally, dielectric heating of the cable is carried out, it has been found advantageous to use the fitted plug as a lead wire to the metallic conductors of the cable core before the initiation of the impregnation. For this purpose, it is constructed to be electrically insulated in the nozzle-like sealing element. Furthermore, this sealing element itself may be produced of an electrical insulation material.

The above-described intermediate lock to be used between the impregnating tank and the jacketing device or press after termination of the impregnating process is a structural element having substantial dimensions and a corresponding weight. Accordingly, a further advantage is obtained by constructing the intermediate lock of several individual tubular elements preferably designed to be transportable on a common base. This transportable design may be accomplished, for example, by driving rollers provided at a transporting gear.

Additional objects and advantages of the present invention will become apparent upon consideration of the following description, when taken in conjunction with the accompanying drawings, in which.

Figure 1:
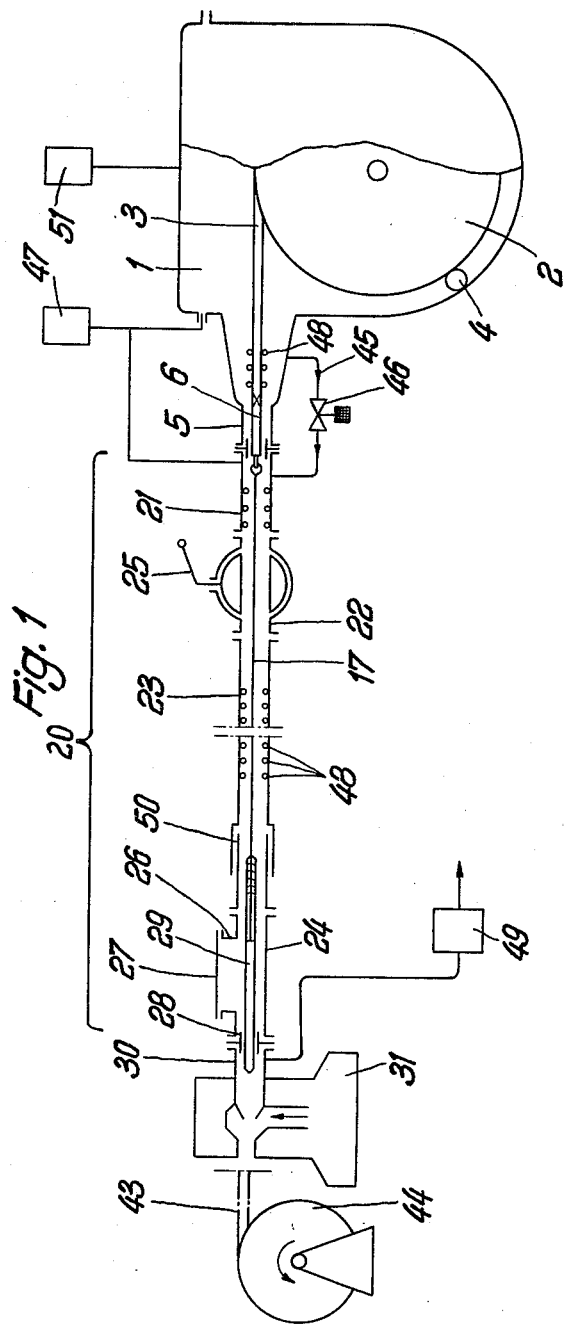
FIGURE 1 is a diagrammatic view of the entire assembly including impregnating tank, intermediate lock, and jacketing press.
Figure 2:
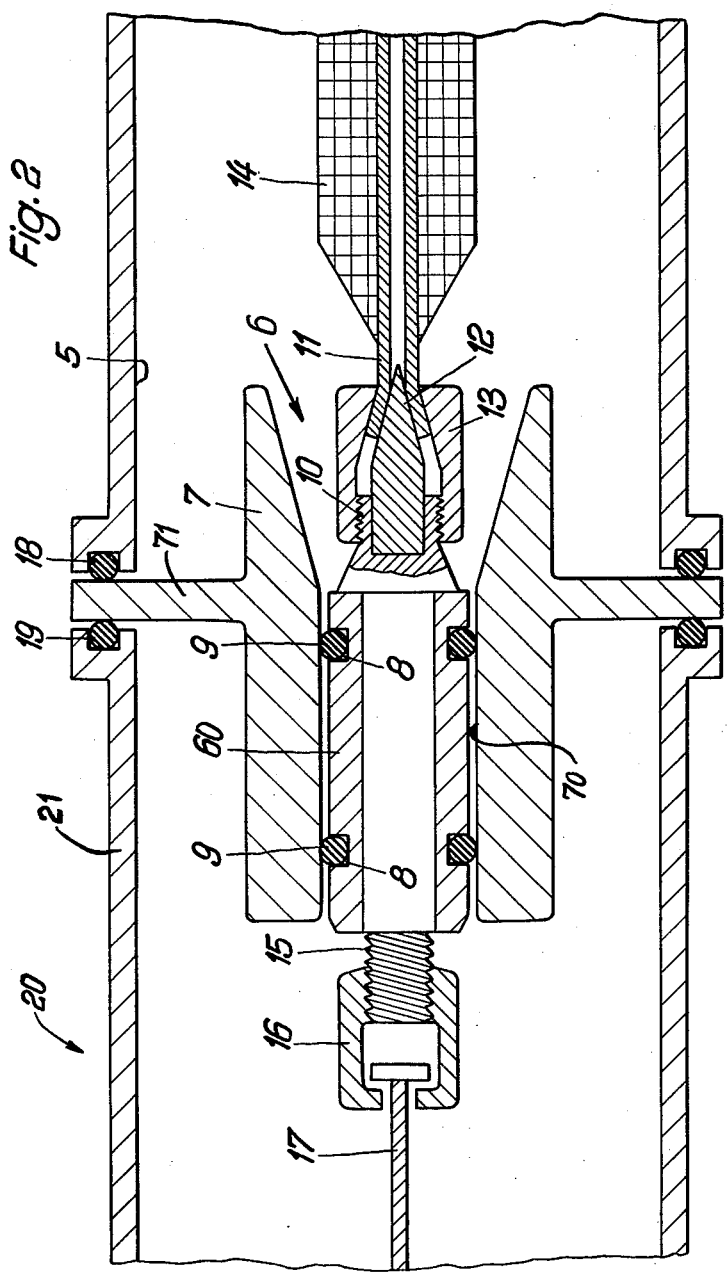
FIGURE 2 is an enlarged longitudinal sectional view taken through the removal opening of the impregnating tank shown in FIGURE 1.

With more particular reference to the drawings, FIGURE 1 illustrates an impregnating tank 1 into which a cable core 3 is introduced, in the form of a roll including a cable reel 2 onto which the cable core is wound. Reel 2 is rotatably mounted on support rolls 4 within the impregnating tank 1. A removal opening 5 is provided in the impregnating tank 1 through which the cable core may be withdrawn. A fitted plug 6 (see FIGURE 2) is disposed within the throat 70 of a nozzle-like sealing element 7 in a vacuum-tight manner, and is connected with the leading end of the cable core. The fitted plug 6 thus seals the throat 70 of the sealing element. This seal is assured by provided gasket rings 9 of a material having rubber-like resilience, disposed in grooves 8 formed in the periphery of plug body 60.

The plug 6 has a threaded lug 10 on the end facing the impregnating tank 1, which is connected to a cable conductor 11 by means of a wedge or spreading piece 12 and a capping sleeve 13. The covering 14 of insulating material is diagrammatically shown as encircling the cable conductor 11. At the other end of plug 6 is a threaded bolt 15 to which electric connection means are fastened when dielectric drying is used.

During removal of the cable from the impregnating tank, threaded bolt 15 provides an expedient point for connecting a clamp sleeve 16 to the plug. A traction rope 17 is connected to sleeve 16. The sealing element 7 has a radially extending flange 71 mounted between circumferential and opposing gasket rings 18 and 19. Thus, this element connects the portion of the impregnating tank 1 in which the removal opening 5 is located, with a tubular intermediate lock chamber 20, in which the gasket ring 19 is disposed.

Lock chamber 20 is constructed of sections 21 through 24 (see FIGURE 1). A valve or valve-like cutoff device 25 is disposed in lock section 22 by means of which the following sections of lock chamber 20 may be cut off or sealed from the throat 70 or receiving opening 5. A demountable servicing hatch door 26 provided with a peephole or observation port 27 having a glass insert is disposed in lock section 24. In order to improve visual observation within the lock, an electric illuminating device (not shown) may be provided. This lock section 24 also is provided with a feeding element or feed plug 29 which is also disposed within a nozzle-like sealing structural element 28 having a throat 80. This feeding plug 29 is disposed in the receiving opening 30 of the lead jacket press 31. The individual sections of the lock are sealed from each other by means of circumferential gasket rings of the type illustrated in FIGURE 2.

Figure 3:
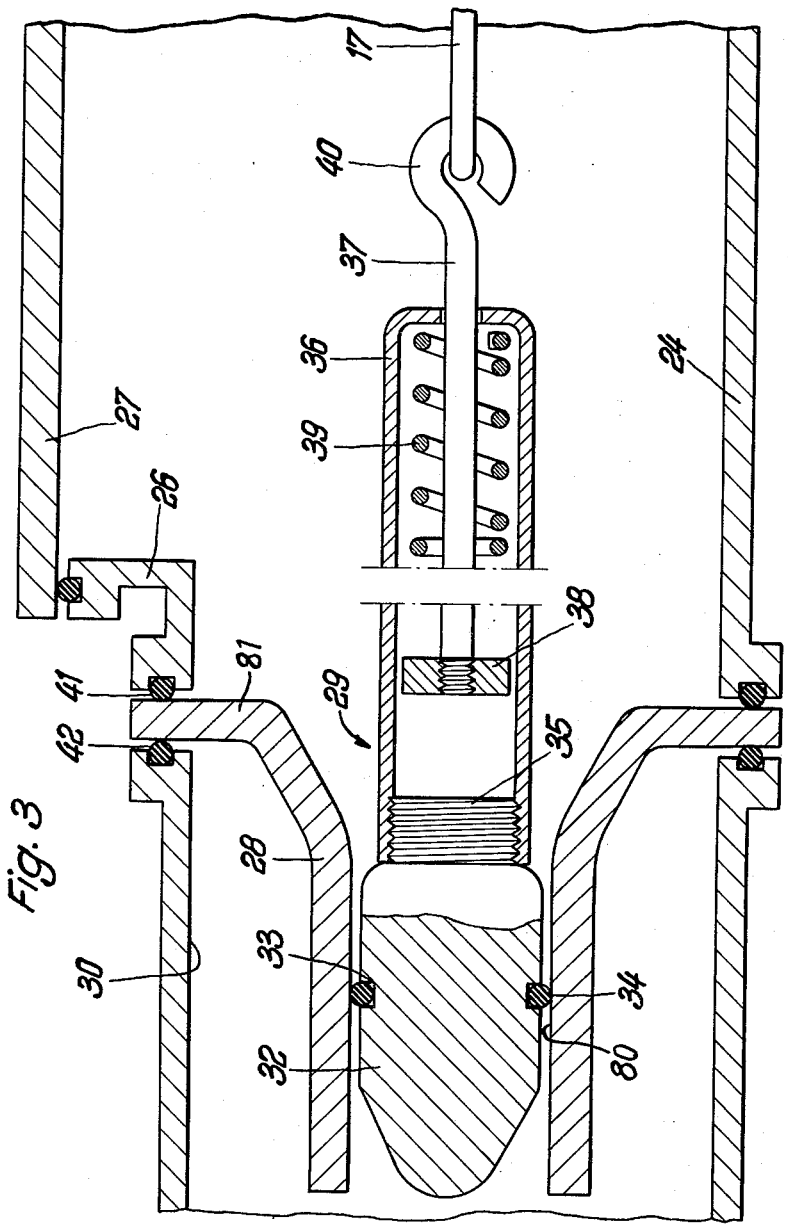
FIGURE 3 is an enlarged longitudinal sectional view taken through the receiving opening of the jacketing press shown in FIGURE 1.

FIGURE 3 illustrates the feeding plug 29 in greater detail. This plug has a conical nose or insert 32 provided with a peripheral annular groove 33 in which a sealing element 34, of a material having rubber-like resilience, is disposed for sealing the throat 80 of nozzle element 28. At the rear of conical insert 32, a threaded coupling 35 is fastened which is threadedly connected with a tubular sleeve 36. A damping device is provided within tubular sleeve 36 and includes a traction rod 37 having a plunger 38 on the end thereof, and a helical spring 39 disposed within tubular sleeve 36 against which plunger 38 may resiliently press. Traction rope 17 is fastened to the hook 40 on the end of traction rod 37.

Circumferential gasket rings 41 and 42 oppose each other and are disposed in the lock section 24 and the receiving opening 30 of lead jacket press 31, respectively. Both of these gaskets engage a radially extending flange 81 on nozzle element 28.

A conduit 45 having a cutoff valve 46 connects impregnating tank 1 with lock section 21. A pump unit 47 which is diagrammatically illustrated in FIGURE 1 is used to evacuate or create a vacuum pressure in impregnating tank 1. This pump unit may, if desired, also be used for evacuating the intermediate lock 20. A plurality of rollers 48 are provided interiorly of impregnating tank 1 for supporting the cable, and similar rollers are provided in the various sections of intermediate lock 20. The oil or other impregnating liquid which enters receiving opening 30 of the lead jacket press 31 from the throat 80 of nozzle element 28 during the removal of the cable, is removed by means of a booster pump 49 and, if desired, returned into the system, i.e., into the impregnating tank 1 after appropriate degassing and cleaning has been performed. A thermal expansion adjusting section 50 is provided in lock section 23 to accommodate thermal expansion of the lock. The finished jacketed cable 43, which is delivered from the lead jacket press 31, is received by a delivery spool 44.

The operation of the above-described device is as follows:

The cable core 3, wound onto cable reel 2, is introduced into impregnating tank 1 and the metallic cable conductor 11 is connected with plug 6 which is inserted into the throat 70 of nozzle element 7. During the process described in the folowing paragraph the sections of the intermediate lock are not yet connected.

The impregnating tank 1 is evacuated, i.e., vacuum pressure is created therein by means of vacuum pump 47 while, at the same time, electric heating of the cable core takes place. For this purpose, an appropriate electric feed line is connected with threaded bolt 15. Upon termination of the vacuum drying operation, impregnating liquid from a storage tank 51 is admitted into the interior of impregnating tank 1 which is thus cooled to a large extent.

Upon termination of the impregnating process proper, removal of the cable is to take place. First removal opening 5 must be connected with the receiving opening 30 by means of the intermediate lock 20. Prior to this, traction rope 17 is connected to plug 6 and feeding plug 29 and is loosely placed into the intermediate lock 20. In the vicinity of the forward end of feeding plug 29, that is, the conical nose 32, the nozzle element 28 is sealed. A clamping ring is placed around the feeding plug, encircling it by means of elastic force.

An electric drive mechanism, which in its turn operates the transport element, transports the feeding plug in direction of the jacket press. The clamping ring being in its end position, i.e. just before reaching the press entrance, the diameter of the clamping ring is increased by a ramp for climbing in such a manner that the connection to the feeding element is cleared. After that the electric drive may be switched off, as the jacket press takes charge of the further transport. Cutoff device 25 is opened and servicing hatch 26 is closed. Then, evacuation of the intermediate lock is accomplished by means of vacuum pump 47. Valve 46 is opened and lock 20 is flooded with impregnating liquid due to its connection with impregnating tank 1.

The operator may observe the filling of the lock through observation port 27. When the lock 20 is completely filled, servicing hatch 26 may be opened so that feeding plug 29 can be pushed into the lead jacket press 31, which is already operating and has already been adjusted to the desired diameter. The feeding plug 29 receives a lead jacket and then traction rope 17 is pulled taut until fitted plug 6 is removed from the throat 70 of nozzle element 7 which it seals.

Finally, the lead jacketing operation takes place about the cable core, after the traction rope 17 and fitted plug 6 have passed through this device. During operation, oil which accumulates at opening 30 is continuously removed by booster pump 49. The leading end of the cable to which the feeding plug, the traction rope, and the fitted plug are connected, may then be directly wound onto the reel at the outlet of the jacketing device.

When the entire length of the cable core has passed through the device, cutoff valve 25 is closed and the trailing end of the cable is provided with a conventional airtight seal after passing through the lead jacket press 31. The nozzle elements 28 and 7, which are provided in the openings are interchangeably mounted in these devices so that if it is desired to operate upon a cable core of a different diameter than the one being processeed at the time, the nozzle elements 7 and 28 may be exchanged for those having different diameter throats and the lead jacketing device may be adjusted accordingly, whereby this device is adapted for use with cable cores of varying diameter.

The total arrangement allows to produce high-tension cables under most different conditions with regard to process engineering. P.E. paper-insulated cables for a voltage of 500 kv. can be dried at a temperature of 120° C. in the drying and impregnating tank, and this up to a residual moisture content of less than 0.1%, the vacuum in the tank being $10^{-4}$ mm. Hg. The lock can be evacuated to the same working pressure. After the drying, the cable is impregnated in the tank with an insulating oil for example at a temperature of 80° C. A previous drying and degassing of the insulating oil is preferable, P.E. to a residual moisture content of about 1 p.p.m. All cable insulating oils, utilized for solid-type cables and oil filled cables may be used for the insulation, P.E. an insulating oil with a viscosity of 30 cst. at 20° C. After cooling of the impregnated cable, the cable can be removed out of the previously evacuated and meanwhile with the same insulating oil filled lock at a speed of 5 m./min. depending on the lead or aluminum press.

During this discharging process it is preferable to maintain a slight excess pressure of P.E. 7.11 p.s.i.g. in the tank and in the lock.

It will be understood that the above description of the present invention is susceptible to various modifications, changes, and adaptations, and the same are intended to be comprehended within the meaning and range of equivalents of the appended claims.

What is claimed is:

1. A device for producing single or multiple electric oil cables, comprising, in combination:
   (a) an impregnating tank for accommodating a cable core, said tank having a cable core outlet opening of the same diameter as a cable core to be treated therein;
   (b) a detachable fitted plug having a maximum diameter equal to that of the cable core and attached thereto, said fitted plug being disposed within said outlet opening to seal said impregnating tank;
   (c) means connected to said impregnating tank for selectively creating vacuum pressure therein;
   (d) a cable core jacketing device having an inlet opening of the same diameter as the cable core;
   (e) a lock disposed intermediate and connected to said impregnating tank and said jacketing device so that said lock is in communication with said impregnating tank via said outlet opening and with said jacketing device via said inlet opening;
   (f) means for selectively filling said impregnating tank and said lock with impregnating liquid;
   (g) a feeding plug connected to said fitted plug by a traction cable, said feeding plug being disposed within said inlet opening to seal the end of said lock from said jacketing device, whereby said fitted plug and said feeding plug seal and said lock from said impregnating tank and said jacketing device; and
   (h) mountable means in said lock adapted to provide access into said lock with said feeding and fitted plugs in their sealing positions so as to permit said feeding plug to be pushed through said inlet opening into said jacketing device thereby causing said cable core to be drawn from said impregnating tank, through said outlet opening, through said lock, through said inlet opening and into said jacketing device.

2. A device for producing single or multiple electric oil cables comprising, in combination:
   (a) an impregnating tank for accommodating a cable core, said tank having a cable core outlet opening of the same diameter as a cable core to be treated therein, said tank having means connectable thereto for selectively creating vacuum pressure therein;
   (b) a detachable fitted plug having a maximum diameter equal to that of the cable core and attachable thereto, said fitted plug being disposable within said outlet opening to seal said impregnating tank;
   (c) a cable core jacketing device having an inlet opening of the same diameter as the cable core;
   (d) a lock chamber disposed intermediate and connectable to said impregnating tank and said jacketing device so that said lock chamber may be in communication with said impregnating tank via said outlet opening and with said jacketing device via said inlet opening, said lock chamber and tank being adapted to have means for selectively filling said impregnating tank and said lock chamber with impregnating liquid; and
   (e) a feeding plug connected to said fitted plug by a traction element, said feeding plug being disposable within said inlet opening to seal the end of said lock chamber from said jacketing device, whereby when said fitted plug and said feeding plug are in said outlet and inlet openings said lock chamber is sealed from said impregnating tank and said jacketing device.

3. A device as defined in claim 2, wherein said lock chamber includes a cutoff valve device associated with said lock near said impregnating device for preventing flow through said lock, a servicing hatch having an observation port associated with said lock chamber near said jacketing device to provide access to the interior of said lock chamber.

4. A device as defined in claim 2 including a damping device for damping the traction force exerted by said traction element.

5. A device as defined in claim 4, wherein said damping device includes a spring within said feeding plug, and a piston rod in said feeding plug displaceable against the spring and projecting from said feeding plug for connection to said traction element.

6. A device as defined in claim 2, wherein said feeding plug and said fitted plug have exterior surface circumferential grooves, and include gasket rings of rubber-like resilience disposed in said grooves.

7. A device as defined in claim 2, wherein said intermediate lock chamber is formed of a plurality of individual tubular sections designed to be transportable on a common base.

8. A deivce as defined in claim 2, comprising a reel at the outlet of said jacketing device onto which the jacketed cable core is to be wound, said feeding plug being constructed to be deformed by bending, whereby said feeding plug, the traction element, and the fitted plug may be wound onto said reel.

9. A device as defined in claim 2 including a cutoff valve device disposed within said lock chamber for regulating fluid flow therethrough, and a demountable door means for providing access into the interior of said lock chamber.

10. A device as defined in claim 6, wherein said fitted plug comprises an electrical conductive portion adapted when connected to the leading end of the cable core to provide an electrical contact therewith, and including insulation means for insulating said electrically conductive portion from said impregnating tank when said fitted plug is fitted in said outlet opening.

References Cited by the Examiner

UNITED STATES PATENTS

| | | | |
|---|---|---|---|
| 1,009,731 | 11/1911 | Fisher | 156—52 XR |
| 3,013,912 | 12/1961 | Priaroggia et al. | 156—51 XR |
| 3,032,464 | 5/1962 | Grieve | 156—51 XR |

EARL M. BERGERT, *Primary Examiner.*